(12) United States Patent
Lee et al.

(10) Patent No.: US 11,384,707 B1
(45) Date of Patent: Jul. 12, 2022

(54) METHOD FOR SENSING DAMAGE TO BEARING OF ENGINE

(71) Applicants: HYUNDAI MOTOR COMPANY, Seoul (KR); KIA CORPORATION, Seoul (KR)

(72) Inventors: Hong-Wook Lee, Hwaseong-si (KR); Byng-Mo Jeon, Hwaseong-si (KR); Sang-Hyuk Mun, Hwaseong-si (KR); Hyung-Mook Yoon, Hwaseong-si (KR); Young-Joon Park, Hwaseong-si (KR); Jun-Ho Park, Hwaseong-si (KR); Sung-Nam Baek, Hwaseong-si (KR); Pan-Sang Kim, Hwaseong-si (KR); Je-Ha Son, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/463,048

(22) Filed: Aug. 31, 2021

(30) Foreign Application Priority Data

Dec. 21, 2020 (KR) .......................... 10-2020-0179977

(51) Int. Cl.
| | |
|---|---|
| *G01H 1/08* | (2006.01) |
| *F02D 41/22* | (2006.01) |
| *F02D 41/14* | (2006.01) |
| *F02D 35/02* | (2006.01) |
| *G01M 13/045* | (2019.01) |

(52) U.S. Cl.
CPC .......... *F02D 41/22* (2013.01); *F02D 35/027* (2013.01); *F02D 41/1498* (2013.01); *G01M 13/045* (2013.01); *F02D 2041/227* (2013.01); *F02D 2200/023* (2013.01); *F02D 2200/602* (2013.01)

(58) Field of Classification Search
CPC ..... F01M 11/12; F02B 77/085; G01M 13/045
See application file for complete search history.

(56) References Cited

U.S. PATENT DOCUMENTS

| | | | |
|---|---|---|---|
| 7,027,953 B2 * | 4/2006 | Klein | G01H 1/006 702/182 |
| 8,990,033 B2 * | 3/2015 | Friedlander | G08B 29/04 702/56 |
| 10,564,070 B1 * | 2/2020 | Im | G01M 15/12 |
| 2019/0112952 A1 * | 4/2019 | Bong | F01L 1/047 |
| 2020/0063668 A1 * | 2/2020 | Jeong | F02D 35/027 |
| 2020/0064225 A1 | 2/2020 | Im et al. | |
| 2020/0064227 A1 * | 2/2020 | Im | G07C 5/0808 |

FOREIGN PATENT DOCUMENTS

| | | |
|---|---|---|
| KR | 10-2010-0062421 A | 6/2010 |
| KR | 10-2020-0023962 A | 3/2020 |
| KR | 10-2097944 B1 | 4/2020 |

OTHER PUBLICATIONS

Search Report issued in related European Application No. 21195709.7 (5 pages).

* cited by examiner

*Primary Examiner* — John Kwon
(74) *Attorney, Agent, or Firm* — Lempia Summerfield Katz LLC

(57) ABSTRACT

A method for sensing damage to a bearing of an engine using a vibration signal may sense the damage to the bearing even without a sensor for directly sensing the damage to the bearing using a frequency signal input to a knocking sensor from the engine for each traveling state (acceleration traveling, cruise traveling, deceleration traveling) of a vehicle.

23 Claims, 11 Drawing Sheets

FIG.7A
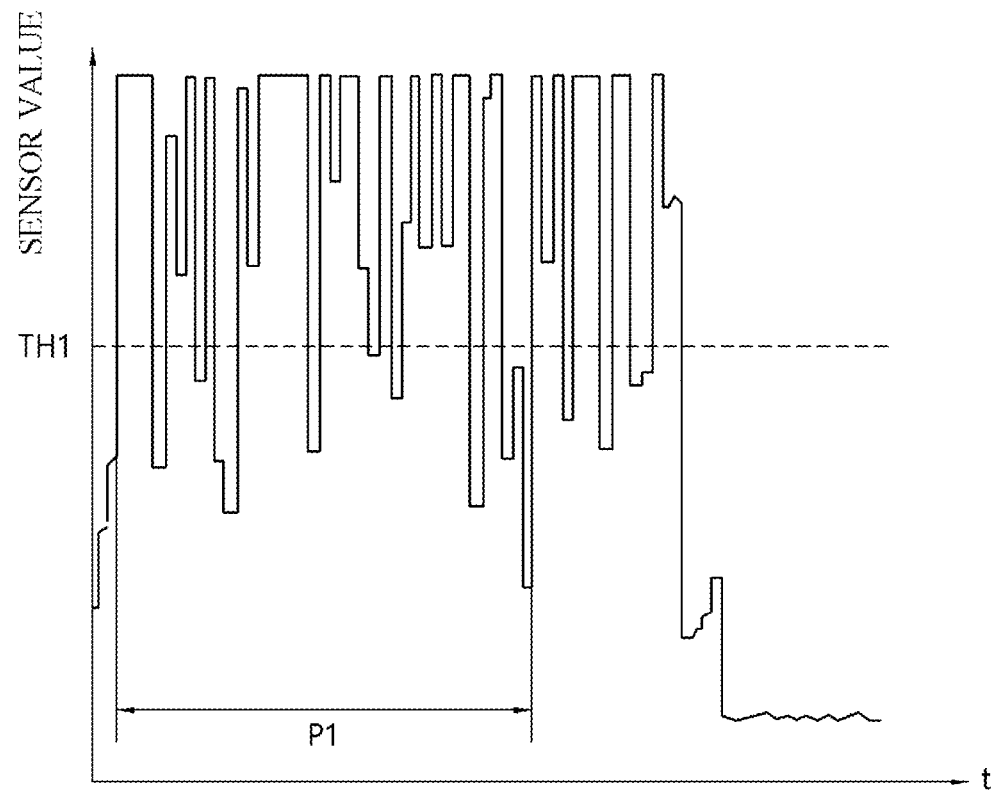
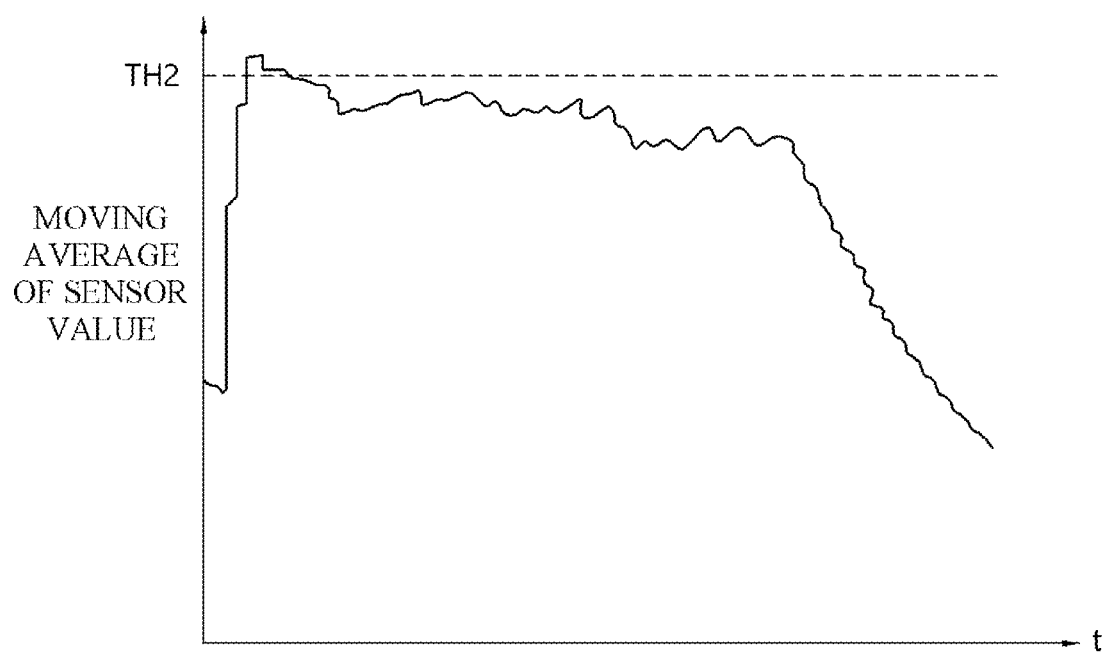

FIG.7B
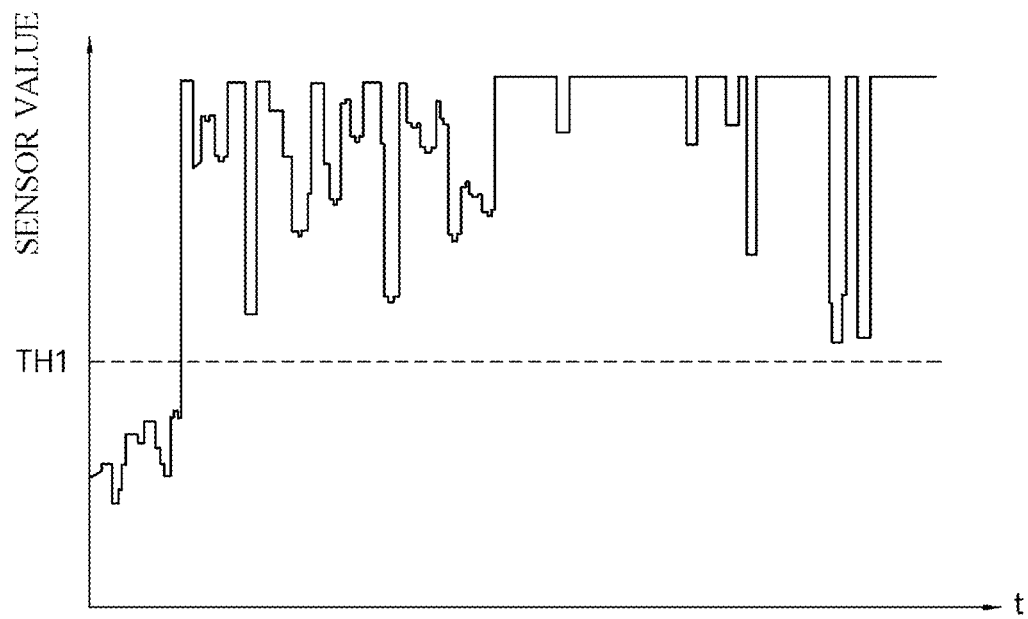
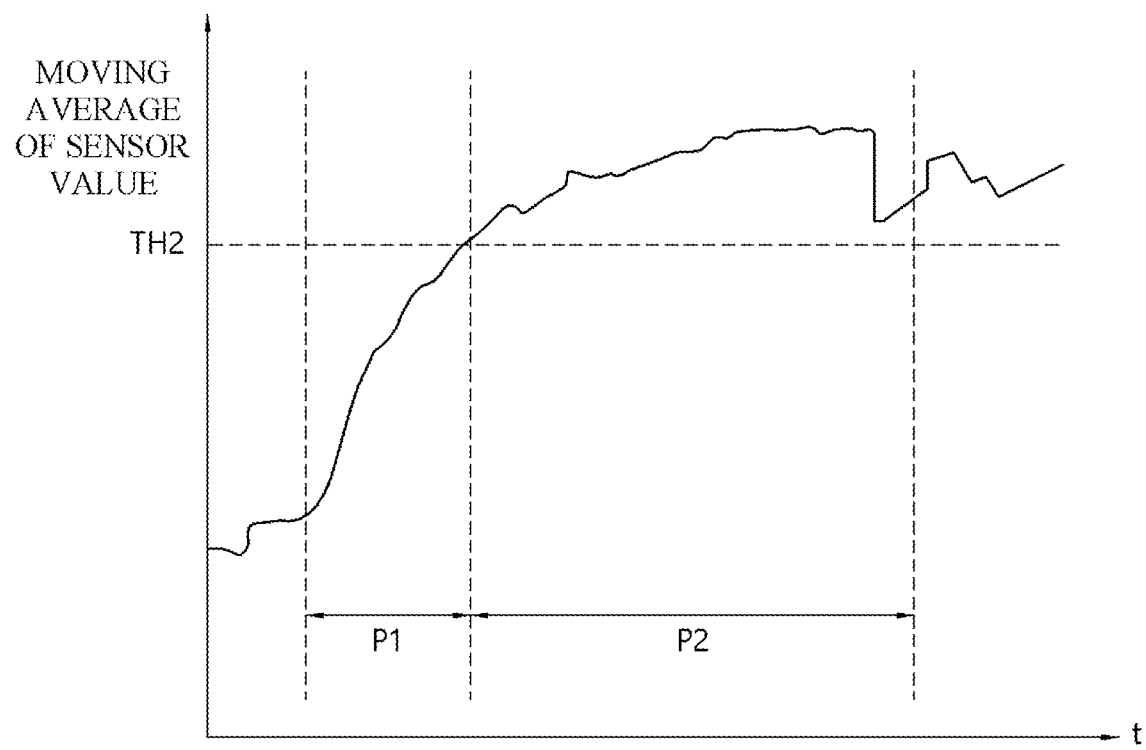

METHOD FOR SENSING DAMAGE TO BEARING OF ENGINE

CROSS-REFERENCE TO RELATED APPLICATION

This application claims priority to and the benefits of Korean Patent Application No. 10-2020-0179977, filed on Dec. 21, 2020, the entire contents of which are incorporated herein by reference.

FIELD

The present disclosure relates to a method for sensing damage to a bearing of an engine of a vehicle.

BACKGROUND

The statements in this section merely provide background information related to the present disclosure and may not constitute prior art.

In an engine for a vehicle, a crankshaft 12 is connected to a cylinder block and a connecting rod 11 is mounted with a bearing 13 to reduce the friction.

FIG. 1 illustrates a portion in which the connecting rod 11 and the crankshaft 12 are coupled. The large end of the connecting rod 11 is fastened to surround a crank pin 12b in the crankshaft 12, and a bearing 13 is provided between the large end of the connecting rod 11 and the crank pin 12b. The crankshaft 12 is supported by the cylinder block through a crank journal 12a, and the small end of the connecting rod 11 is connected to a piston 14. Further, an engine oil is filled between the large end of the connecting rod 11 and the crank pin 12b to reduce the friction between the large end of the connecting rod 11 and the crank pin 12b upon operation. In a normal state, a gap between the bearing 13 and the crank pin 12b is small, and an oil layer is formed by the oil therebetween and thus noise and vibration are small.

Meanwhile, when the engine is operated for a long time in a state where foreign matters are introduced into a portion installed with the bearing 13, or the processing defect (e.g., the processing defect of the connecting rod journal) occurs in the bearing 13 or a portion of contacting the bearing 13, the bearing 13 is worn and damaged. When such a state continues, the gap between the bearing 13 and the crank pin 12b is large, the noise and vibration due to the hitting occur, and the bearing 13 and the crank pin 12b are seized.

As described above, when the bearing 13 and the crank pin 12b are seized, the oil supply between the large end of the connecting rod 11 and the crank pin 12b is stopped, such that there occurs a problem such as the turning-off of the vehicle or the damage to the engine.

In general, a technology has been used to sense the damage to the bearing using a sensor for sensing the vibration of the engine, that is, a knocking sensor in order to sense the damage to the bearing.

However, we have discovered that a vibration signal of the engine measured by the knocking sensor should be classified into a knocking signal and a bearing damage signal and processed by an engine control unit (ECU) for the vehicle. However, if the ECU may process only one signal, there is a problem in that the ECU may not be applied. To solve such a problem, the ECU for the vehicle should be replaced with a new ECU capable of processing two signals, or should apply a kit for sensing the damage to the bearing separately. The new ECU is easily applied to the vehicle under development, but it is not easy to apply the new ECU to the vehicle already mass-produced and operated by a consumer. Since the mass-produced vehicle has a low hardware specification of the ECU and thus may not apply a new logic, the ECU of the vehicle under development should be replaced by developing the new ECU and producing the new ECU.

Further, the application of the separate kit is likely to cause the unexpected side effect.

Further, all of the application of the new ECU and the application of the separate kit inevitably consume lots of costs.

SUMMARY

The present disclosure provides a method for sensing the damage to a bearing of an engine, which may sense the damage of a bearing using one vibration signal received from a vibration sensor (knocking sensor) of an engine.

In one form of the present disclosure, a method for sensing damage to a bearing of an engine includes: a traveling state determination step which determines, by a controller for controlling the engine, whether the vehicle is accelerating or decelerating; an upon-acceleration diagnosis step which distinguishes, by the controller, a signal generated from combustion knocking from a signal generated from a damaged bearing, among signals sensed by a knocking sensor in a combustion knocking monitoring frequency band during acceleration of the vehicle, and increases, by the controller, an upon-acceleration diagnosis count when determined that the bearing is damaged based on the signal generated from the damaged bearing; an upon-deceleration diagnosis step which increases, by the controller, an upon-deceleration diagnosis counter, when the signal generated from the damaged bearing is sensed by the knocking sensor in a bearing damage monitoring frequency band during deceleration of the vehicle; a damage determination step which compares, by the controller, the upon-acceleration diagnosis counter and the upon-deceleration diagnosis counter with a bearing damage reference for confirming the damage to the bearing, and a bearing damage confirmation step which confirms, by the controller, that the bearing is damaged, when the upon-acceleration diagnosis counter and the upon-deceleration diagnosis counter are the bearing damage reference or more.

The traveling state determination step determines that the vehicle is accelerating when an accelerator pedal is being operated, and the vehicle is decelerating when the accelerator pedal is not operated.

The combustion knocking monitoring frequency band is the band of 10 kHz to 18 kHz, and the bearing damage monitoring frequency band is the band of 1 kHz to 8 kHz.

The upon-acceleration diagnosis step includes: an upon-acceleration frequency monitoring step which monitors, by the controller, the vibration signal of the engine sensed by the knocking sensor in the combustion knocking monitoring frequency band, an upon-acceleration diagnosis entry determination step which determines, by the controller, whether a time at which a sensor value of the knocking sensor exceeds a first reference value starting the diagnosis of the damage to the bearing is a preset first reference time or more upon acceleration, an upon-acceleration damage determination step which determines, by the controller, whether a time at which the sensor value of the knocking sensor exceeds a second reference value determining the damage to the bearing is a preset second reference time or more upon acceleration, when the sensor value of the knocking sensor exceeds the first reference value, and an upon-acceleration diagnosis counter increment step which increases, by the controller, an upon-acceleration diagnosis counter for determining the damage to the bearing upon acceleration, when the sensor value of the knocking sensor exceeds the second reference value.

The second reference value is set to be larger than the first reference value.

The first reference time and the second reference time are set as a rotational cycle of the engine.

In the upon-acceleration damage determination step, the sensor value of the knocking sensor is a moving average value.

When the sensor value of the knocking sensor does not exceed the first reference value in the upon-acceleration diagnosis entry determination step, or the sensor value of the knocking sensor does not exceed the second reference value in the upon-acceleration damage determination step, one of the traveling state determination step and the upon-acceleration diagnosis entry determination step is performed again.

The upon-deceleration diagnosis step includes: an upon-deceleration frequency monitoring step which monitors, by the controller, the vibration signal of the engine sensed by the knocking sensor in the bearing damage monitoring frequency band, an upon-deceleration diagnosis entry determination step which determines, by the controller, whether the sensor value of the knocking sensor exceeds a third reference value starting the diagnosis for the damage to the bearing upon deceleration and a time at which the sensor value of the knocking sensor exceeds the third reference value is a third reference time or more starting the diagnosis for the damage to the bearing upon deceleration, an upon-deceleration damage determination step which determines, by the controller, whether the sensor value of the knocking sensor exceeds a fourth reference value which is a reference value for determining the damage to the bearing, and an upon-deceleration diagnosis counter increment step which increases, by the controller, an upon-deceleration diagnosis counter for determining the damage to the bearing upon deceleration when the sensor value of the knocking sensor exceeds the fourth reference value.

When the sensor value of the knocking sensor does not exceed the third reference value in the upon-deceleration diagnosis entry determination step, or a time at which the sensor value of the knocking sensor exceeds the third reference value is less than the third reference time even if the sensor value of the knocking sensor exceeds the third reference value, one of the traveling state determination step and the upon-deceleration diagnosis entry determination step is performed again.

When the sensor value of the knocking sensor does not exceed the fourth reference value in the upon-deceleration damage determination step, one of the traveling state determination step and the upon-deceleration diagnosis entry determination step is performed again.

The bearing damage confirmation step confirms whether the upon-acceleration diagnosis counter and the upon-deceleration diagnosis counter are '1' or more, respectively.

Before the traveling state determination step, the method for sensing the damage to the bearing of the engine further includes: a diagnosis start determination step which determines whether the engine or the vehicle is in a state for sensing the damage to the bearing, in which the diagnosis start determination step determines whether a temperature of engine oil is higher than a preset diagnosis start temperature.

After the bearing damage confirmation step, a limp home mode step, which limits the revolutions per minute (RPM) of the engine to a preset maximum safety engine RPM or less, is performed.

After the bearing damage confirmation step, a warning means operation step, which operates a warning means installed inside the vehicle, and alerts a passenger of the damage to the bearing when the bearing is damaged, is performed.

Meanwhile, a method for sensing damage to a bearing of an engine according to the present disclosure for achieving the object, in the method for sensing damage to the bearing of the engine which senses the damage to the bearing installed on the engine with a vibration signal sensed by a knocking sensor installed on the engine for a vehicle, includes: a traveling state determination step which determines, by a controller for controlling the engine, whether the vehicle is accelerating, an upon-acceleration frequency monitoring step which monitors, by the controller, the vibration signal of the engine sensed by the knocking sensor in a combustion knocking monitoring frequency band, when the vehicle is accelerating, an upon-acceleration diagnosis entry determination step which determines whether a time at which a sensor value of the knocking sensor exceeds a first reference value starting the diagnosis for the damage to the bearing is a preset first reference time or more upon acceleration, an upon-acceleration damage determination step which determines whether a time at which the sensor value of the knocking sensor exceed a second reference value determining the damage to the bearing is a preset second reference time or more upon acceleration when the sensor value of the knocking sensor exceeds the first reference value, an upon-acceleration diagnosis counter increment step which increases an upon-acceleration diagnosis counter for determining the damage to the bearing upon acceleration, when the sensor value of the knocking sensor exceeds the second reference value, a damage determination step which compares, by the controller, the upon-acceleration diagnosis counter with a bearing damage reference for confirming the damage to the bearing, and a bearing damage confirmation step which confirms, by the controller, that the bearing is damaged, when the upon-acceleration diagnosis counter is the bearing damage reference or more.

After the bearing damage confirmation step, a limp home mode step, which limits the RPM of the engine to a preset maximum safety engine RPM or less, is performed.

After the bearing damage confirmation step, a warning means operation step, which operates a warning means installed inside the vehicle, and alerts a passenger of the damage to the bearing when the bearing is damaged, is performed.

Further, a method for sensing damage to a bearing of an engine according to the present disclosure for achieving the object, in the method for sensing damage to the bearing of the engine which senses the damage to the bearing installed on the engine with a vibration signal sensed by a knocking sensor installed on the engine for a vehicle, includes: a traveling state determination step which determines, by a controller for controlling the engine, whether the vehicle is decelerating, an upon-deceleration frequency monitoring step which monitors, by the controller, the vibration signal of the engine sensed by the knocking sensor in a bearing damage monitoring frequency band, when it is determined that the vehicle is decelerating in the traveling state determination step, an upon-deceleration diagnosis entry determination step which determines whether a sensor value of the knocking sensor exceeds a third reference value starting the diagnosis for the damage to the bearing and a time at which the sensor value of the knocking sensor exceeds the third reference value is a third reference time or more starting the diagnosis for the damage to the bearing upon deceleration, an upon-deceleration damage determination step which determines whether the sensor value of the knocking sensor exceeds a fourth reference value which is a reference value for determining the damage to the bearing, an upon-deceleration diagnosis counter increment step which increases an upon-deceleration diagnosis counter for determining the damage to the bearing upon deceleration when the sensor value of the knocking sensor exceeds the fourth reference value, a damage determination step which compares, by the controller, the upon-deceleration diagnosis counter with a bearing damage reference for confirming the damage to the bearing, and a bearing damage confirmation step which confirms, by the controller, that the bearing is damaged, when the upon-deceleration diagnosis counter is the bearing damage reference or more.

After the bearing damage confirmation step, a limp home mode step, which limits the RPM of the engine to a preset maximum safety engine RPM or less, is performed.

After the bearing damage confirmation step, a warning means operation step, which operates a warning means installed inside the vehicle, and alerts a passenger of the damage to the bearing when the bearing is damaged, is performed.

The method for sensing the damage to the bearing of the engine according to the present disclosure having the above configuration may sense the damage to the bearing with only one vibration signal collected by the knocking sensor installed in the engine.

It is possible to increase the accuracy of sensing the damage to the bearing by changing the frequency in the section where there is no knocking according to whether the combustion knocking according to the traveling condition of the vehicle is diagnosed. Further, it is possible to prevent the combustion knocking or the shock vibration from being erroneously diagnosed as the damage to the bearing by maintaining the conventional diagnosis frequency in the section of diagnosing the knocking, but distinguishing the combustion knocking and the damage to the bearing using a characteristic difference between the combustion knocking and the bearing damage signal.

Further, it is possible to sense the damage to the bearing only by upgrading the software of the ECU of the vehicle in operation without applying the new ECU or the separate kit, thereby saving the cost.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 5A and 5B are graphs illustrating a change of a knocking signal according to an engine state in the engine in which the bearing is damaged, in which FIG. 5A is a graph illustrating a change in a sensor value in a combustion knocking monitoring frequency band, and FIG. 5B is a graph illustrating a change in a sensor value in a bearing damage monitoring frequency band;

FIGS. 6A and 6B are graphs schematically illustrating a change in the sensor value of the knocking sensor upon acceleration, in which FIG. 6A is a graph illustrating a change in a sensor value upon excess combustion knocking, and FIG. 6B is a graph illustrating a change in a sensor value upon damage to the bearing;

Figure 8A:
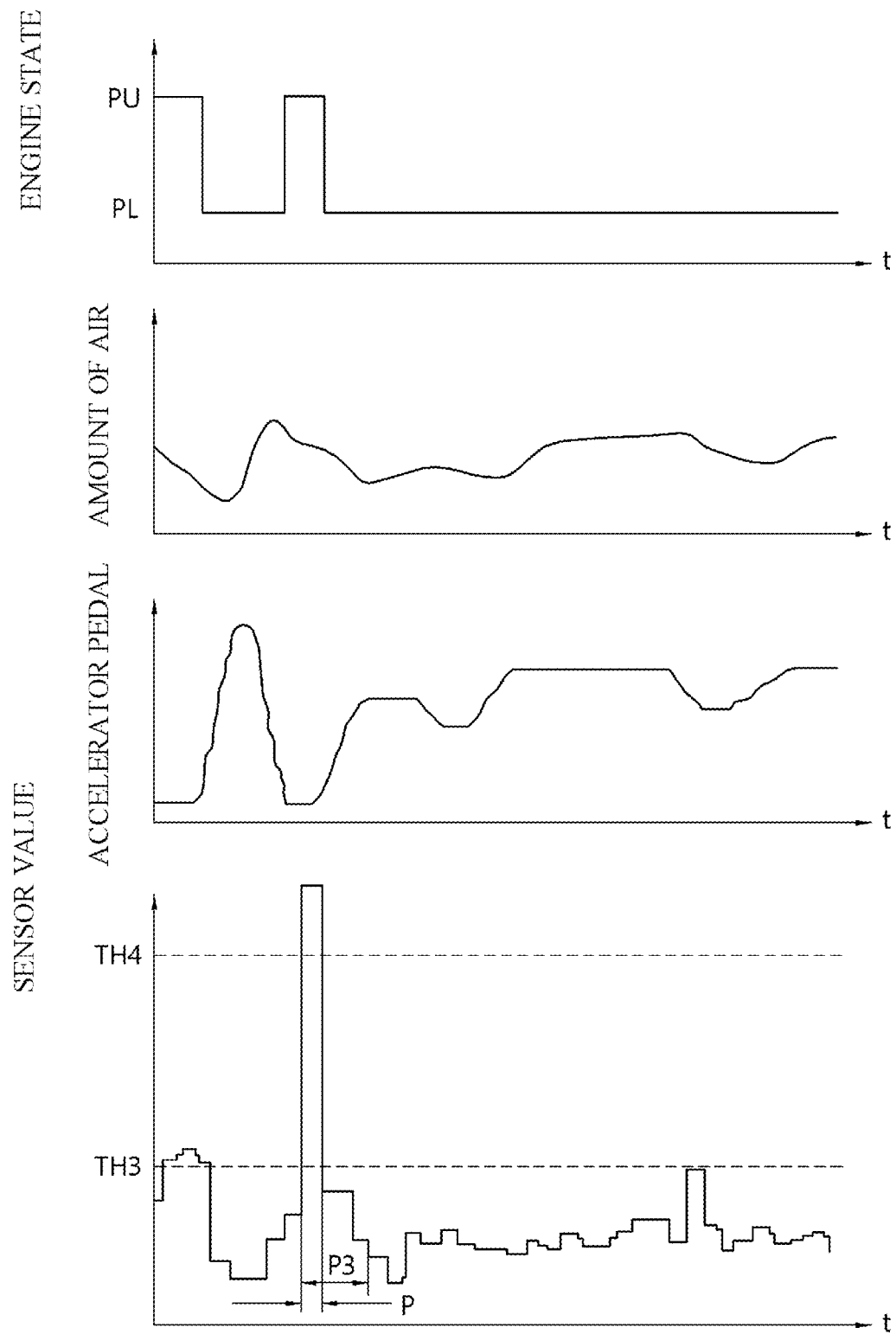
Figure 8B:
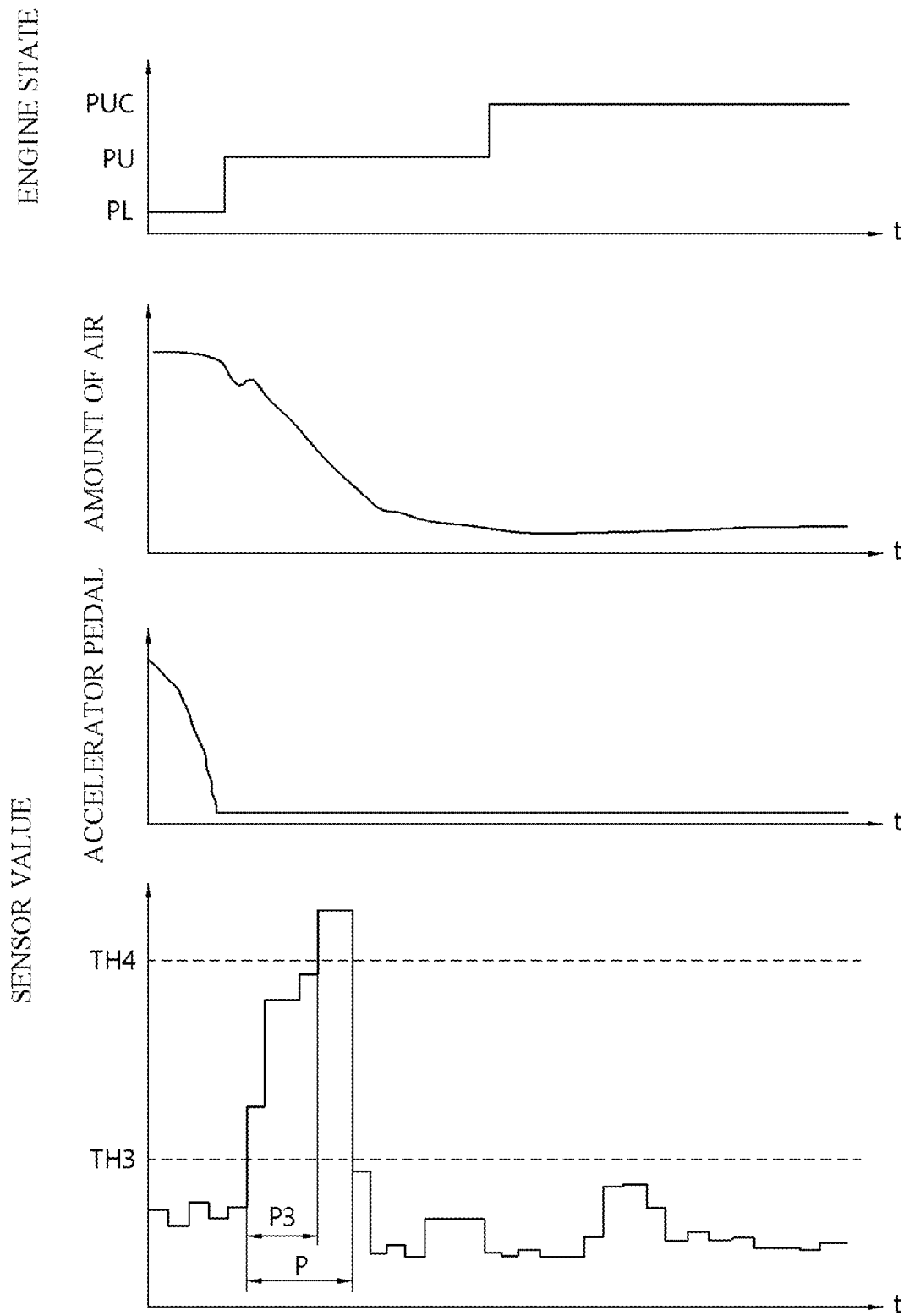

FIGS. 7A and 7B are graphs illustrating a principle of determining the damage to the bearing upon acceleration, in which FIG. 7A is a graph illustrating a change in a sensor value upon excess combustion knocking, and FIG. 7B is a graph illustrating a change in a sensor value upon damage to the bearing; and FIGS. 8A and 8B are graphs illustrating a principle of determining the damage to the bearing upon deceleration, in which FIG. 8A is a graph illustrating a change in a sensor value due to single shock, and FIG. 8B is a graph illustrating a change in a sensor value upon damage to the bearing.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a method for sensing the damage to a bearing of an engine according to the present disclosure will be described in detail with reference to the accompanying drawings.

In one form of the present disclosure, a method for sensing a damage to a bearing of an engine senses the damage to a bearing 13 installed in the engine using a vibration signal sensed by a knocking sensor 15 installed in the engine 1 for a vehicle. In particular, the method includes: a traveling state determination step (S120), which determines, by a controller 20 for controlling the engine 1, whether a vehicle is accelerated or decelerated; an upon-acceleration diagnosis step (S200), which increases, by the controller 20, an upon-acceleration diagnosis counter (C1), when it is determined that the bearing 13 is damaged by distinguishing a signal by combustion knocking and a signal by the damage to the bearing 13 from a signal sensed by the knocking sensor 15 in a combustion knocking monitoring frequency band (F_A) upon acceleration; an upon-deceleration diagnosis step (S300), which increases, by the controller 20, an upon-deceleration diagnosis counter (C2), when the signal by the damage to the bearing 13 is sensed from a signal sensed by the knocking sensor 15 in a bearing damage monitoring frequency band (F_B) upon deceleration; a damage determination step (S410), which compares, by the controller 20, the upon-acceleration diagnosis counter (C1)

and the upon-deceleration diagnosis counter (C2) with a bearing damage reference (C) for confirming the damage to the bearing 13; and a bearing damage confirmation step (S420), which confirms, by the controller 20, that the bearing 13 is damaged, when the upon-acceleration diagnosis counter (C1) and the upon-deceleration diagnosis counter (C2) are the bearing damage reference (C) or more.

Figure 1:
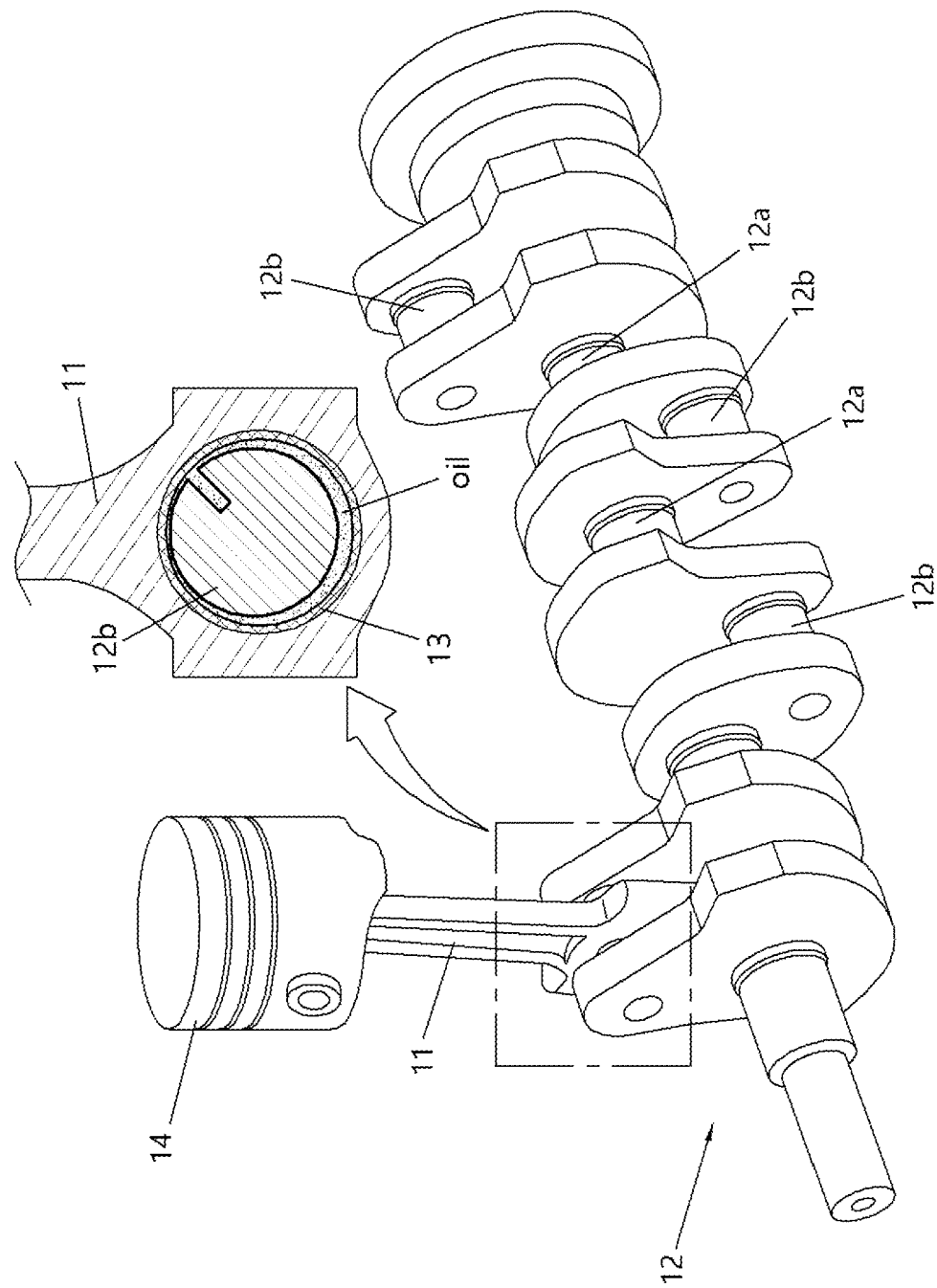
FIG. 1 is a schematic diagram illustrating a state where a bearing is mounted on a portion in which a connecting rod and a crank pin are connected in an engine.
Figure 2:
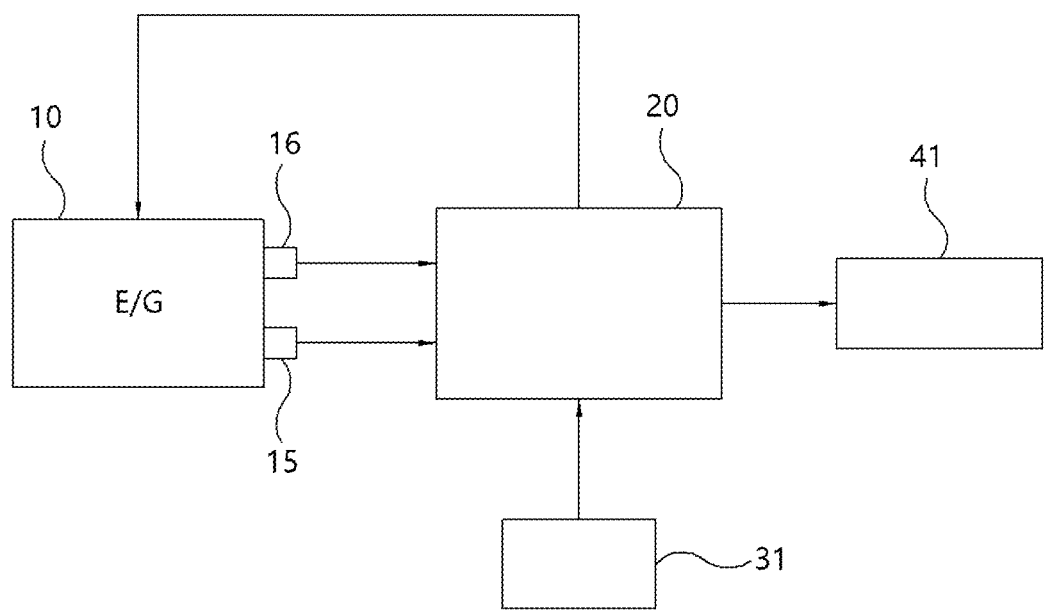
FIG. 2 is a block diagram illustrating a system for performing a method for sensing the damage to the bearing of the engine according to one form of the present disclosure.
Figure 3:
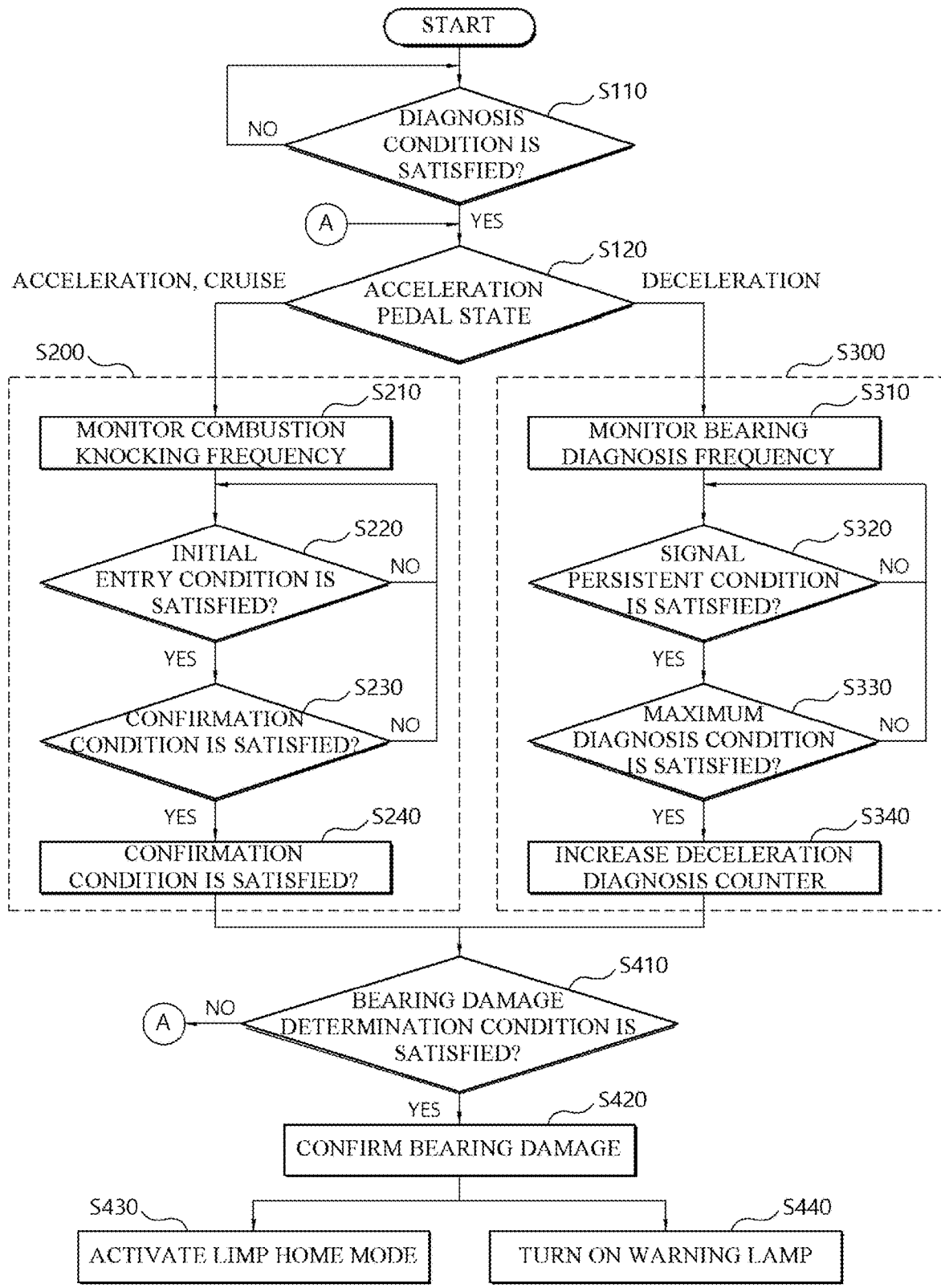
FIG. 3 is a flowchart illustrating the method for sensing the damage to the bearing of the engine according to another form of the present disclosure.

First describing a system for performing the method for sensing the damage to the bearing of the engine according to the present disclosure, as illustrated in FIG. 2, the system includes the knocking sensor 15 which is an example of a vibration sensing means installed on one side of the engine 1 to measure the vibration delivered from the engine 1 to sense the knocking of the engine 1, and the controller 20 for controlling an operation of the engine 1, and distinguishing a vibration signal generated by the engine 1 to determine that the bearing 13 is damaged.

The method for sensing the damage to the bearing of the engine to be described later is stored in the controller 20 as a logic to sense the damage to the bearing 13. Hereinafter, the ECU will be described as the controller 20 as an example.

The method for sensing the damage to the bearing of the engine according to the present disclosure is applied to a case where the controller 20, that is, the engine control unit (ECU) may process only one frequency signal.

The ECU 20 determines the traveling state of the vehicle and with respect to the combustion knocking and the damage to the bearing, uses a signal in a frequency band in which the combustion knocking is sensed upon acceleration and uses a signal in a frequency band in which the damage to the bearing is well diagnosed upon deceleration.

Figure 4:
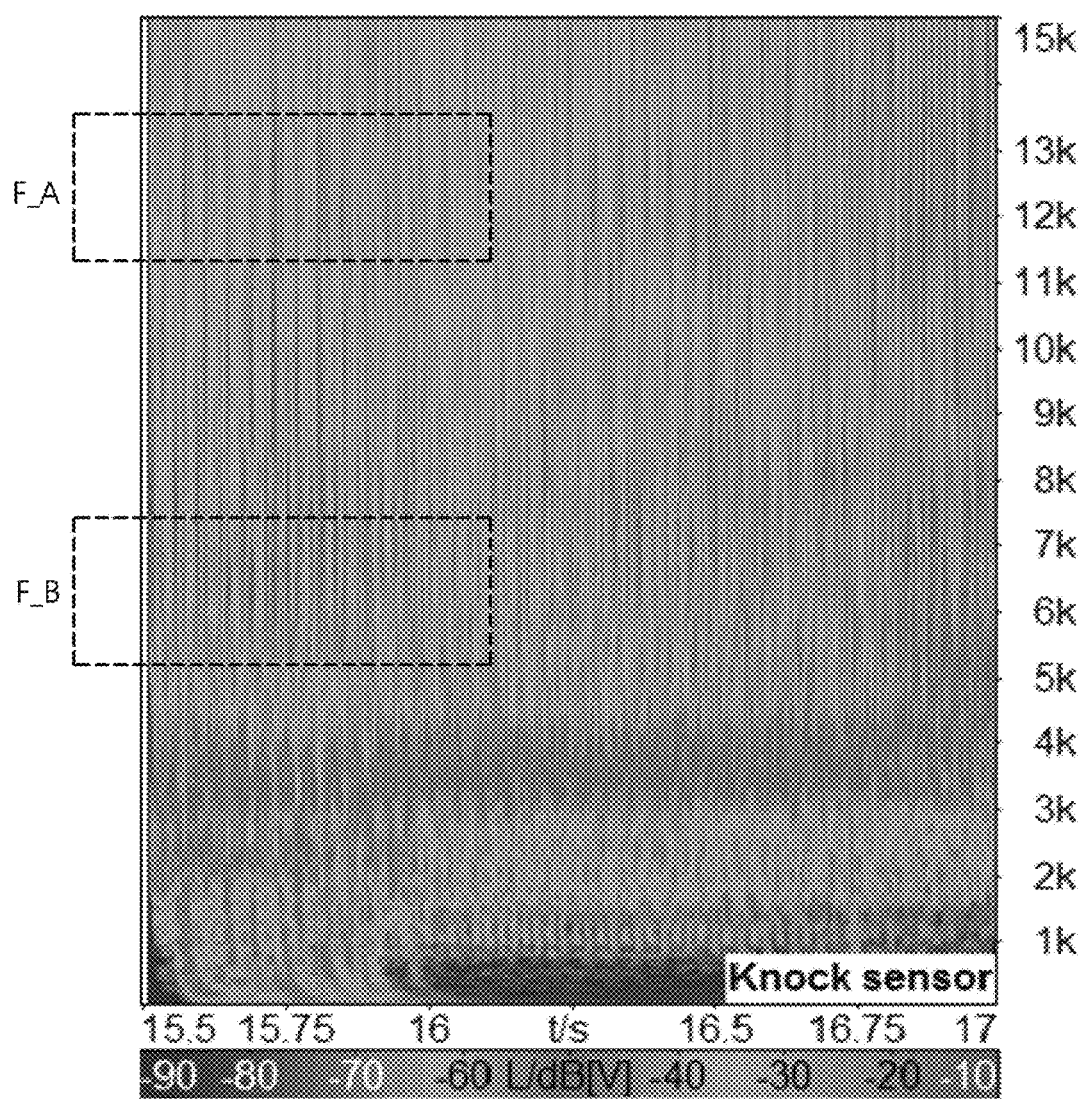
FIG. 4 is a graph illustrating a vibration signal measured by a knocking sensor in the engine in which the bearing is damaged.

FIG. 4 illustrates a signal sensed by the knocking sensor 15 in the engine 1 in which the bearing is damaged.

Upon acceleration, the signal in the frequency band (F_A) in which the combustion knocking is sensed is used. Upon acceleration, the combustion knocking of the engine 1 should be sensed, such that the signal in the frequency band in which the combustion knocking is sensed, that is, the combustion knocking monitoring frequency band (F_A) is used, and whether the signal sensed by the knocking sensor 15 is generated by the combustion knocking or generated by the damage to the bearing is determined to sense the damage to the bearing 13. Generally, the combustion knocking monitoring frequency band (F_A) becomes 10 kHz to 18 kHz.

Figure 5A:
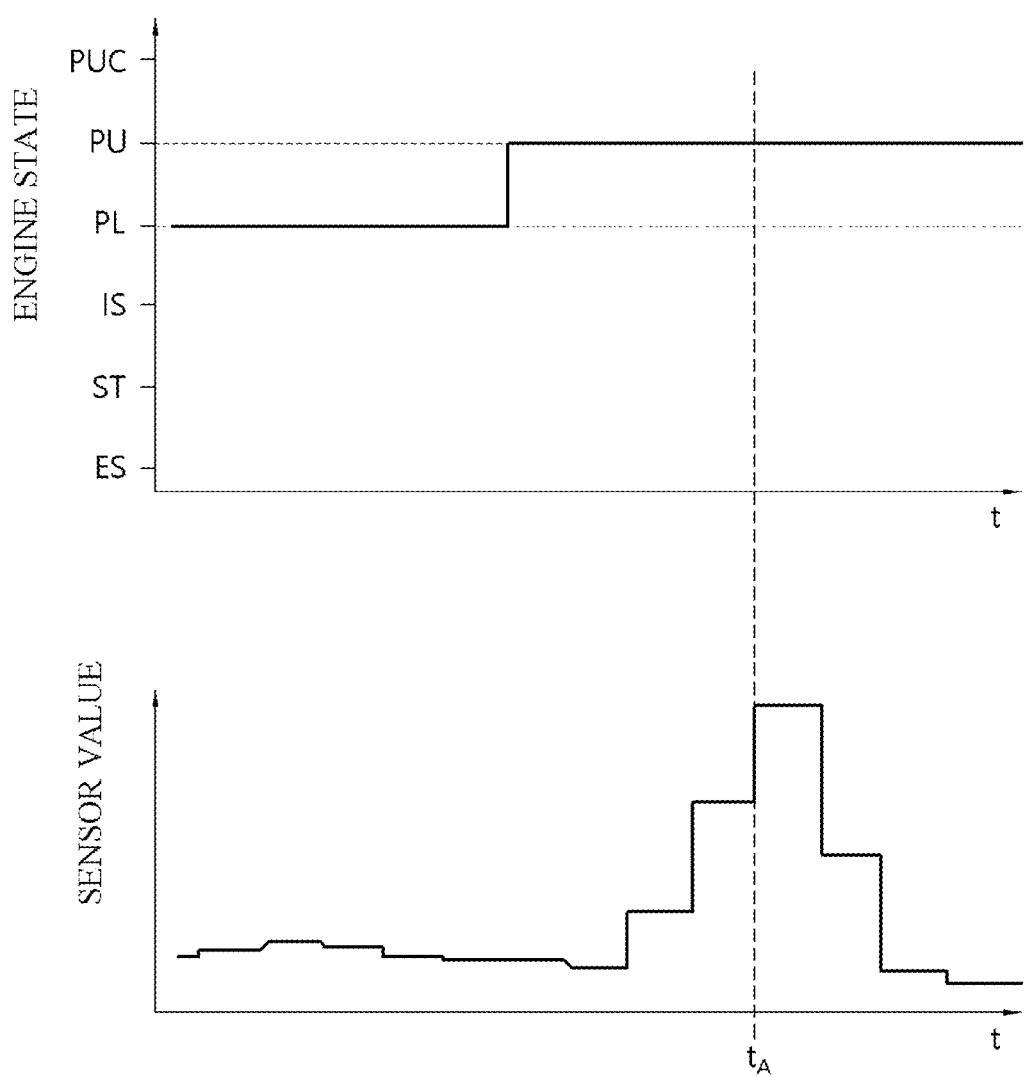
Figure 5B:
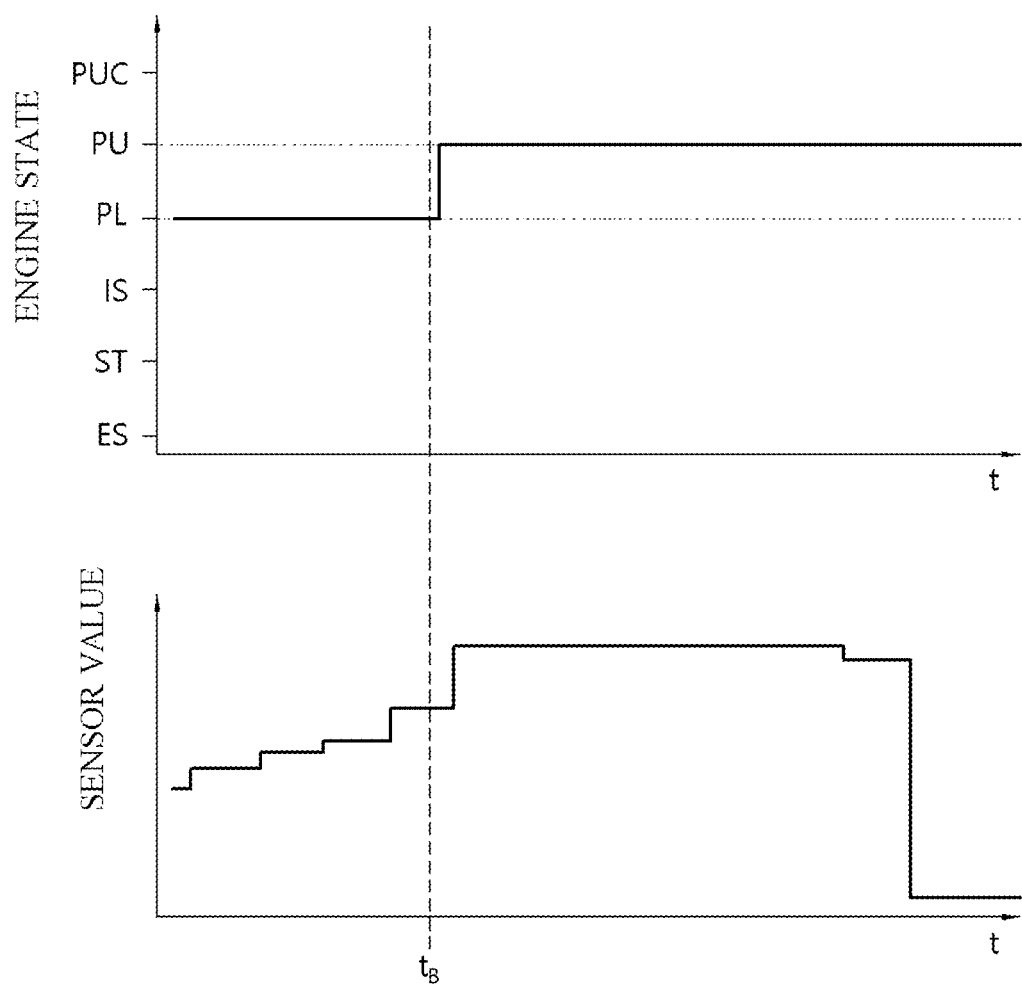

Further, upon deceleration, the engine 1 is not combusted and thus it is unnecessary to sense the combustion knocking, such that the signal in the frequency band (F_B) in which the damage to the bearing may be well diagnosed is used. The signal by the damage to the bearing 13 is generated in the entire band upon damage to the bearing 13, but the frequency band different from the signal by the combustion knocking is used. Generally, the bearing damage monitoring frequency band (F_B) becomes 1 kHz to 8 kHz. As illustrated in FIGS. 5A and 5B, the frequency band is changed in the engine in which the bearing is damaged, such that when an operation state of the engine 1 is changed from a partial load (PL) into a deceleration state without fuel cut (PU), the damage to the bearing may be better diagnosed.

The combustion knocking monitoring frequency band (F_A) and the bearing damage monitoring frequency band (F_B) may be determined and used as a narrower frequency band within the aforementioned range according to the engine 1 within the aforementioned frequency band.

For example, the combustion knocking monitoring frequency band (F_A) may use the signal in the band of 11 kHz or 15 kHz, and the bearing damage monitoring frequency band (F_B) may use the signal in the band of 6 kHz.

If the ECU 20 may process only one frequency signal due to the constraint of hardware, the ECU 20 may have the diagnosis capability such as the ECU 20 capable of processing a plurality of frequency signals even without replacing the ECU 20, or adding a separate kit capable of additionally processing the frequency signal.

A diagnosis start determination step (S110) determines whether the engine 1 or the vehicle is in a state for sensing the damage to the bearing 13. Since the present disclosure senses the damage to the bearing 13 using the vibration generated by the engine 1 while the engine 1 is being operated, the diagnosis start determination step (S110) determines whether the engine 1 is sufficiently warmed-up and a vibration signal of the engine 1 is stabilized, and then starts the diagnosis for the bearing 13. Before the engine 1 is warmed-up, the noise due to the friction of various instruments is generated, thereby not accurately determining the damage to the bearing 13, such that the diagnosis start determination step (S110) determines whether the engine 1 is warmed-up and diagnoses the damage to the bearing 13 in a state where the engine is warmed-up. Meanwhile, the state of the engine 1 is diagnosed using the vibration of the engine 1, such that the present disclosure determines whether the engine is warmed-up by a temperature of the engine oil measured by an oil temperature sensor 16 instead of a temperature of coolant. When a temperature (T_oil) of the engine oil is higher than a preset diagnosis start temperature (T_THD) (T_oil>T_THD), the diagnosis for the damage to the bearing 13 may be started. Here, the diagnosis start temperature (T_THD) may be set as 80° C.

The traveling state determination step (S120) determines the operation state of the engine 1 using whether an accelerator pedal 31 is operated. According to one form of the present disclosure, the ECU 20 is desired to receive and process one signal from the knocking sensor 15, thereby changing the frequency according to the operation state of the engine 1, such that the operation state of the engine 1 is determined by the accelerator pedal 31.

According to the determination result of the traveling state determination step (S120), any one of the upon-acceleration diagnosis step (S200) or the upon-deceleration diagnosis step (S300) to be described later is performed.

For example, in a deceleration state where the accelerator pedal 31 is not operated (a pedal value=0), the engine 1 is not combusted and thus it is unnecessary to diagnose the combustion knocking of the engine 1, such that the frequency band is changed into the frequency band in which the damage to the bearing 13 may be well diagnosed, that is, the bearing damage monitoring frequency band (F_B). Generally, the bearing damage monitoring frequency band (F_B) may become 1 kHz to 8 kHz.

Further, in a state where the accelerator pedal 31 is operated (the pedal value>0), that is, an acceleration or cruise traveling state, it is desired to diagnose the combustion knocking of the engine, such that the conventional frequency band for diagnosing the frequency of the combustion knocking, that is, the combustion knocking monitoring frequency band (F_A) is maintained. Generally, the combustion knocking monitoring frequency band (F_A) becomes 10 kHz to 18 kHz.

The upon-acceleration diagnosis step (S200) determines the damage to the bearing 13 upon acceleration (including the cruise traveling) of the vehicle. Upon acceleration, an engine knocking signal is generated in the engine 1, such that the upon-acceleration diagnosis step (S200) determines whether a sensor value output by the knocking sensor 15 is generated by the combustion knocking, or generated by the damage to the bearing 13.

Since the present disclosure senses the damage to the bearing 13 with one sensor value output by the knocking sensor 15, the present disclosure monitors the signal in the frequency band for sensing the combustion knocking upon acceleration by the upon-acceleration diagnosis step (S200), and distinguishes whether an abnormal signal sensed by the knocking sensor 15 is generated by the combustion knocking or generated by the damage to the bearing 13 to sense the damage to the bearing 13.

However, the upon-acceleration diagnosis step (S200) does not confirm the damage to the bearing 13, and increases a counter for confirming the damage to the bearing 13, that is, an upon-acceleration diagnosis counter (C1). The final confirmation for the damage to the bearing 13 is determined by the bearing damage confirmation step (S420) to be described later.

An upon-acceleration frequency monitoring step (S210) continuously receives and monitors, by the ECU 20, the signal of the combustion knocking monitoring frequency band (F_A) from the knocking sensor 15. When sensing the abnormal signal from the signal output by the knocking sensor 15, the controller 20 distinguishes whether the abnormal signal is generated by the combustion knocking or generated by the damage to the bearing 13.

An upon-acceleration diagnosis entry determination step (S220) determines, by the ECU 20, whether the signal input from the knocking sensor 15 exceeds a first reference value (TH1) in the combustion knocking monitoring frequency band (F_A) to determine whether the bearing 13 is damaged upon acceleration. The first reference value (TH1) becomes the reference for starting the diagnosis for the damage to the bearing 13 upon acceleration.

While the vehicle is accelerating, if the engine 1 is normally operated, that is, if the combustion knocking is not caused and the bearing 13 is not damaged either, the sensor value of the knocking sensor 15 becomes the first reference value (TH1) or less.

Further, the upon-acceleration diagnosis entry determination step (S220) determines whether the sensor value of the knocking sensor 15 exceeds the first reference value (TH1) and the continued time exceeds a first reference time (P1). Here, the first reference time (P1) is set as a rotational cycle of the engine 1, and the first reference time (P1) may become 40 cycles.

For example, when the sensor value of the knocking sensor 15 is 3 V or more and maintains 40 cycles by setting the first reference value (TH1) as 3 V, upon acceleration, the diagnosis for the damage to the bearing 13 is started.

Figure 6A:
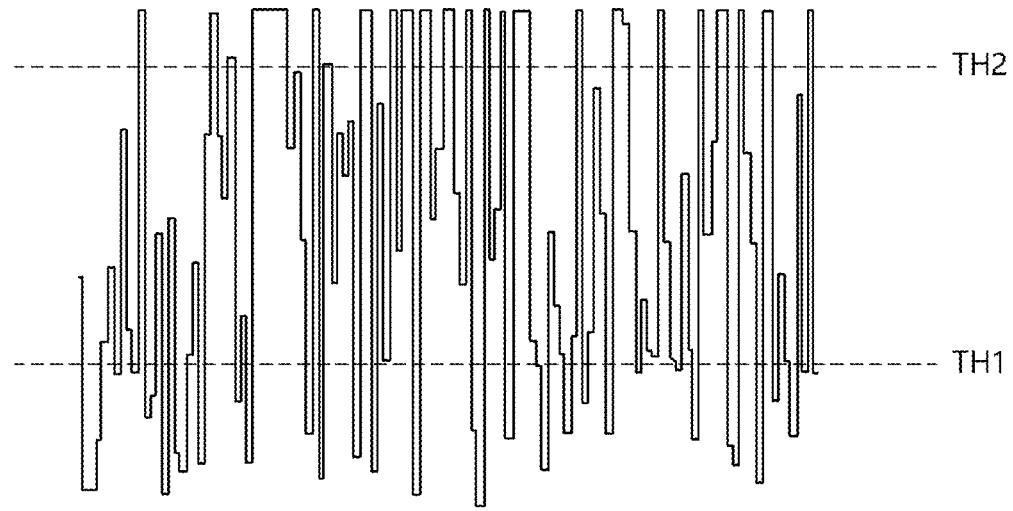

If the combustion knocking is caused, the sensor value of the knocking sensor 15 intermittently exceeds the first reference value (TH1) and is not generated every cycle, such that the fluctuation of the signal is very large (see FIG. 6A). Some sensor values of the knocking signal also exceed a second reference value (TH2) for confirming the damage to the bearing 13, but upon combustion knocking, such a phenomenon does not continue, and the sensor values are lower than the first reference value (TH1) and the second reference value (TH2).

Figure 6B:
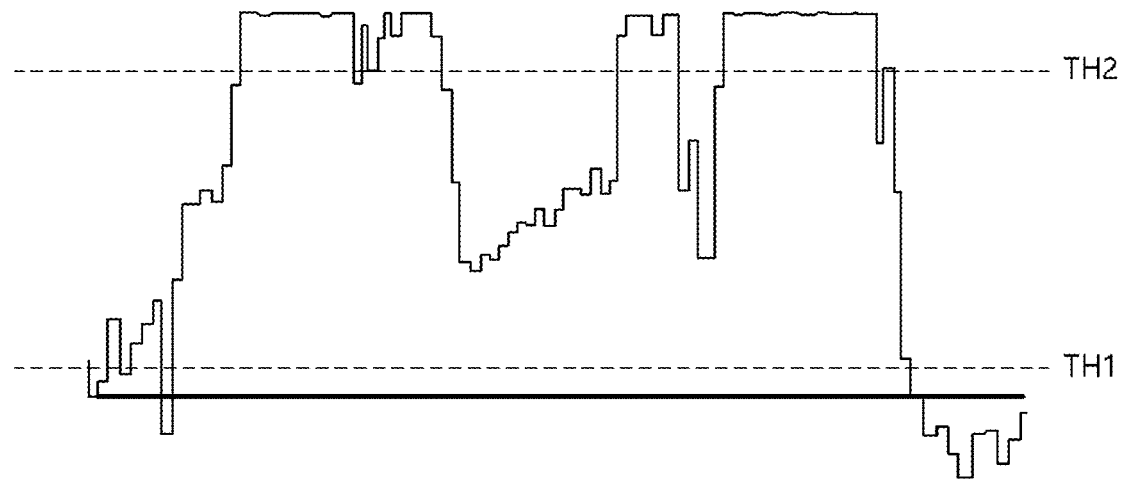

However, if the bearing 13 is damaged, an abnormal signal is generated every cycle due to the increase in a gap of a rotational part, such that the sensor value of the knocking sensor 15 continuously maintains the state of exceeding the first reference value (TH1) to also exceed the first reference time (P1) (see FIG. 6B). Further, a state of exceeding the second reference value (TH2) frequently occurs, and such a state is maintained during several cycles.

Therefore, the upon-acceleration diagnosis entry determination step (S220) determines a time at which the sensor value of the knocking sensor 15 exceeds the first reference value (TH1) and continues to determine whether to sense the damage to the bearing 13 upon acceleration.

In the upon-acceleration diagnosis entry determination step (S220), when the signal input from the knocking sensor 15 does not exceed the first reference value (TH1), the upon-acceleration diagnosis entry determination step (S220) is repeatedly performed.

When the signal input from the knocking sensor 15 exceeds the first reference value (TH1) in the upon-acceleration diagnosis entry determination step (S220), an upon-acceleration damage determination step (S230) determines, by the ECU 20, whether the signal input from the knocking sensor 15 exceeds the second reference value (TH2) in the combustion knocking monitoring frequency band to determine whether the bearing 13 is damaged.

Here, the instantaneous sensor value of the knocking sensor 15 may also be used at it is, but a moving average of the sensor value of the knocking sensor 15 can be used. Since the damage to the bearing 13 is determined using the moving average which is an average obtained by accumulating the sensor value measured by the knocking sensor 15 during a predetermined time, it is helpful to determine whether the transient fluctuation of the sensor value is caused by the transient abnormality or caused by a non-transient factor like the damage to the bearing 13.

Further, the second reference value (TH2) is set to be higher than the first reference value (TH1). For example, when the first reference value (TH1) measured by the knocking sensor 15 is 3.0 V, the second reference value (TH2) becomes 4.8 V.

The upon-acceleration damage determination step (S230) compares the time at which the sensor value of the knocking sensor 15 exceeds the second reference value (TH2) as well as whether the sensor value of the knocking sensor 15 exceeds the second reference value (TH2). Here, the second reference value (TH2) may become 100 cycles.

For example, when the sensor value of the knocking sensor 15 exceeds the second reference value (TH2) and the time at which the sensor value of the knocking sensor 15 exceeds the second reference value (TH2) exceeds the second reference time (P2), the upon-acceleration damage determination step (S230) determines that the bearing 13 is damaged. That is, as illustrated in FIG. 7B, in a state where the sensor value of the knocking sensor 15 exceeds the first reference value (TH1) and the time at which the sensor value of the knocking sensor 15 exceeds the first reference value (TH1) exceeds the first reference time (P1), the upon-acceleration damage determination step (S230) determines whether the moving average value of the knocking sensor 15 exceeds the second reference value (TH2) and the time at which the moving average value of the knocking sensor 15 exceeds the second reference value (TH2) exceeds the second reference time (P2) for confirming the damage to the bearing 13. Here, the second reference time (P2) is set as the rotational cycle of the engine 1, and the second reference time may become 100 cycles. The first reference time (P1) and the second reference time (P2) are set as the rotational cycle of the engine 1 at which the damage to the bearing 13 may be accurately diagnosed without misdiagnosis.

When the sensor value of the knocking sensor 15 exceeds the second reference value (TH2) and the time at which the sensor value of the knocking sensor 15 exceeds the second reference value (TH2) exceeds the second reference time (P2), an upon-acceleration diagnosis counter increment step (S240) to be described later is performed.

When a condition is not satisfied in the upon-acceleration damage determination step (S230), the step returns to the upon-acceleration diagnosis entry determination step (S220).

For example, even if the sensor value of the knocking sensor 15 is less than the second reference value (TH2) or the sensor value of the knocking sensor 15 exceeds the second reference value (TH2), when the time at which the sensor value of the knocking sensor 15 is less than the second reference value (TH2) or the sensor value of the knocking sensor 15 exceeds the second reference value (TH2) is less than the second reference time (P2) (see FIG. 7 A), it is determined as the combustion knocking.

Meanwhile, when the conditions are not satisfied in the upon-acceleration diagnosis entry determination step (S220) and the upon-acceleration damage determination step (S230), the step returns to the traveling state determination step (S120), and if the traveling state is changed, the damage to the bearing 13 may be correspondingly sensed again.

If the upon-acceleration damage determination step (S230) determines that the bearing 13 is damaged, the upon-acceleration diagnosis counter increment step (S240) increases the upon-acceleration diagnosis counter (C1) counting the damage to the bearing 13. When the sensor value of the knocking sensor 15 exceeds the second reference value (TH2) and the time at which the sensor value of the knocking sensor 15 exceeds the second reference value (TH2) exceeds the second reference time (P2) in the upon-acceleration damage determination step (S230), the upon-acceleration damage determination step (S230) increases the upon-acceleration diagnosis counter (C1).

When confirming the damage to the bearing 13 upon acceleration or cruise traveling of the vehicle, the controller 20 increases and accumulates the upon-acceleration diagnosis counter (C1).

The upon-deceleration diagnosis step (S300) determines the damage to the bearing 13 upon deceleration of the vehicle.

Upon deceleration of the vehicle, the engine 1 is not combusted and the engine knocking signal is not generated. Therefore, since it is unnecessary to diagnose the combustion knocking, the damage to the bearing 13 is determined by changing the frequency band sensed by the knocking sensor 15 and processed by the controller 20 into the frequency band in which the damage to the bearing may be well diagnosed, that is, the bearing damage monitoring frequency band (F_B).

However, the damage to the bearing 13 is not confirmed in the upon-deceleration diagnosis step (S300) either and the counter for confirming the damage to the bearing 13, that is, an upon-deceleration diagnosis counter (C2) is increased. The final confirmation for the damage to the bearing 13 is determined by the bearing damage confirmation step (S420) to be described later.

An upon-deceleration frequency monitoring step (S310) continuously receives and monitors, by the ECU 20, the signal of the bearing damage monitoring frequency band (F_B) for well sensing the damage to the bearing 13 from the knocking sensor 15.

An upon-deceleration diagnosis entry determination step (S320) determines, by the ECU 20, whether the signal input from the knocking sensor 15 exceeds a third reference value (TH3) in the bearing damage monitoring frequency band (F_B) to determine whether the damage to the bearing 13 is diagnosed upon deceleration. The third reference value becomes a reference for starting the determination for the damage to the bearing 13 upon deceleration.

For example, when the sensor value of the knocking sensor 15 becomes 1.75 V or more by setting the third reference value (TH3) as 1.75 V, the diagnosis for the damage to the bearing 13 is started.

Further, the upon-deceleration diagnosis entry determination step (S320) determines whether a time (P) at which the sensor value exceeds the third reference value (TH3) is a third reference time (P3) or more at which the diagnosis for the damage to the bearing 13 is started as well as whether the sensor value of the knocking sensor 15 exceeds the third reference value (TH3) together.

For example, the third reference time (P3) is set as the rotational cycle of the engine 1, and if the time at which the sensor value of the knocking sensor 15 exceeds 1.75 V is maintained during 4 cycles upon deceleration by setting the third reference time (P3) as 4 cycles, the damage to the bearing 13 starts to be sensed.

An upon-deceleration damage determination step (S330) determines, by the ECU 20, whether the signal input from the knocking sensor 15 exceeds a fourth reference value (TH4) which is a reference value for determining the damage to the bearing 13 to determine whether the bearing 13 is damaged.

Upon deceleration, the single shock vibration is caused, such that in a state where the sensor value of the knocking sensor 15 is not generally high, only a peak value is high (the sensor value of the knocking sensor does not generally exceed the third reference value and only the peak exceeds the fourth reference value) and the maintenance time (P) is not long. However, when the bearing 13 is damaged, the peak value also exceeds the fourth reference value, while an abnormal signal is consecutively generated in the bearing damage monitoring frequency band (F_B) to the degree at which the damage to the bearing 13 is questionable (while the sensor value of the knocking sensor exceeds the third reference value for the third reference time).

Therefore, the damage to the bearing 13 is sensed upon deceleration by determining whether the time (P) at which the sensor value of the knocking sensor 15 exceeds the third reference value (TH3) is the third reference time (P3) or more in the upon-deceleration diagnosis entry determination step (S320) and whether the knocking signal exceeds the fourth reference value (TH4) in the upon-deceleration damage determination step (S330).

As illustrated in FIG. 8A, when the operation state of the engine operated with the partial load (PL) is changed into the deceleration state without fuel cut (PU), the sensor value of the knocking sensor 15 exceeds the fourth reference value (TH4), but the time (P) maintaining the state is less than the third reference time (P3) and temporary, thereby not being diagnosed as the damage to the bearing 13. However, as illustrated in FIG. 8B, when the engine operated with the partial load (PL) enters into the PU state while being operated in a deceleration state with fuel cut (PUC) through the deceleration state without fuel cut (PU), if the time (P) at which the sensor value of the knocking sensor 15 exceeds the third reference value (TH3) exceeds the third reference time (P3), and during that time, the sensor value of the knocking sensor 15 exceeds the fourth reference value (TH4), it is diagnosed that the bearing 13 is damaged.

That is, when the time (P) at which the sensor value of the knocking sensor 15 exceeds the third reference value (TH3) is the third reference time (P3) or more, and exceeds the fourth reference value (TH4) during that time (P), it is diagnosed that the bearing 13 is damaged.

As described above, when the sensor value of the knocking sensor 15 exceeds the third reference value (TH3) and the time (P) exceeds the third reference time (P3), the diagnosis is started (S320), and when the sensor value of the knocking sensor 15 exceeds the fourth reference value (TH4), it is determined that the damage is caused (S330), thereby diagnosing the damage to the bearing 13 upon deceleration.

Meanwhile, when the conditions are not satisfied in the upon-deceleration diagnosis entry determination step (S320) and the upon-deceleration damage determination step (S330), the step returns to the upon-deceleration diagnosis entry determination step (S320).

Alternatively, when the conditions are not satisfied in the upon-deceleration diagnosis entry determination step (S320) and the upon-deceleration damage determination step (S330), the step returns to the traveling state determination step (S120), and if the traveling state is changed, the damage to the bearing 13 may be correspondingly sensed again.

If it is determined that the bearing 13 is damaged in the upon-deceleration damage determination step (S330), an upon-deceleration diagnosis counter increment step (S340) increases the upon-deceleration diagnosis counter (C2) counting the damage to the bearing 13.

When confirming the damage to the bearing 13 upon deceleration traveling of the vehicle, the controller 20 increases and cumulatively counts the upon-deceleration diagnosis counter (C2).

The damage determination step (S410) determines whether the upon-acceleration diagnosis counter (C1) and the upon-deceleration diagnosis counter (C2) reach a predefined reference to determine whether the bearing 13 is damaged.

To determine whether the bearing 13 is damaged in the damage determination step (S410), when the upon-acceleration diagnosis counter (C1) and the upon-deceleration diagnosis counter (C2) reach a bearing damage reference (C) confirming that the bearing 13 is damaged (C1+C2=C), whether the bearing 13 is damaged is determined.

Here, the upon-acceleration diagnosis counter (C1) and the upon-deceleration diagnosis counter (C2) are '1' or more, respectively.

The damage to the bearing 13 may be determined by comparing a value obtained by summing the upon-acceleration diagnosis counter (C1) and the upon-deceleration diagnosis counter (C2) with the bearing damage reference (C), but in this case, the misdiagnosis likely occurs, such that the upon-acceleration diagnosis counter (C1) and the upon-deceleration diagnosis counter (C2) become '1' or more, respectively.

That is, when only the upon-acceleration diagnosis counter (C1) reaches a predefined reference (upon-deceleration diagnosis counter=0) or only the upon-deceleration diagnosis counter (C2) reaches the predefined reference (upon-acceleration diagnosis counter=0), a signal irrelevant to the damage to the bearing 13 is included, such that the misdiagnosis likely occurs.

On the other hand, upon damage to the bearing 13, the abnormal signal is generated both upon acceleration or deceleration, such that the upon-acceleration diagnosis counter (C1) and the upon-deceleration diagnosis counter (C2) become '1' or more, respectively, thereby reducing the misdiagnosis.

Further, the damage determination step (S410) determines whether the upon-acceleration diagnosis counter (C1) and the upon-deceleration diagnosis counter (C2) reach each reference within a predetermined number of times of acceleration. For example, when two upon-acceleration diagnosis counters (C1) and one upon-deceleration diagnosis counter (C2) are generated and accumulated in five acceleration conditions, this may be determined as the damage to the bearing 13.

Of course, when only one of the upon-acceleration diagnosis counter (C1) and the upon-deceleration diagnosis counter (C2) reaches the predetermined bearing damage reference (C) (C1=C or C2=C), the damage to the bearing 13 may also be finally confirmed. For example, if one of the upon-acceleration diagnosis counter (C1) and the upon-deceleration diagnosis counter (C2) exceeds '3', the damage to the bearing 13 may also be confirmed.

Meanwhile, when the upon-acceleration diagnosis counter (C1) and the upon-deceleration diagnosis counter (C2) do not reach the reference in the damage determination step (S410), the logic returns to the traveling state determination step (S120) and each step described above is performed again.

When the upon-acceleration diagnosis counter (C1) and the upon-deceleration diagnosis counter (C2) reach the predefined reference in the damage determination step (S410), the bearing damage confirmation step (S420) confirms, by the ECU 20, that the bearing 13 is damaged.

When the ECU 20 confirms that the bearing 13 is damaged in the bearing damage confirmation step (S420), a limp home mode step (S430) limits the RPM of the engine 1 to a preset maximum safety engine RPM or less. By limiting the RPM of the engine 1, it is possible to prevent the bearing 13 from being additionally damaged to prevent the engine 1 from being stopped, and to operate the vehicle to a place where it may be maintained.

If it is confirmed that the bearing 13 is damaged, a warning means operation step (S440) operates a warning means installed inside the vehicle such that a passenger may easily perceive the damage to the bearing 13. For example, a warning sound may be generated by turning on a warning lamp 41 installed on a cluster of the vehicle, or through a speaker installed inside the vehicle.

What is claimed is:

1. A method for sensing damage to a bearing of an engine for a vehicle, the method comprising:
    a traveling state determination step which determines, by a controller, whether the vehicle is accelerating or decelerating;
    an upon-acceleration diagnosis step which distinguishes, by the controller, a signal generated from combustion knocking from a signal generated from a damaged bearing, among signals sensed by a knocking sensor in a combustion knocking monitoring frequency band during acceleration of the vehicle, and increases, by the controller, an upon-acceleration diagnosis count when determined that the bearing is damaged based on the signal generated from the damaged bearing;
    an upon-deceleration diagnosis step which increases, by the controller, an upon-deceleration diagnosis count, when the signal generated from the damaged bearing is sensed by the knocking sensor in a bearing damage monitoring frequency band during deceleration of the vehicle;
    a damage determination step which compares, by the controller, the upon-acceleration diagnosis count and the upon-deceleration diagnosis count with a bearing damage reference so as to confirm the damage to the bearing; and a bearing damage confirmation step which confirms, by the controller, that the bearing is damaged, when the upon-acceleration diagnosis count and the upon-deceleration diagnosis count are equal to or greater than the bearing damage reference.

2. The method of claim 1, wherein the traveling state determination step determines that the vehicle is accelerating when an accelerator pedal is being operated, and the vehicle is decelerating when the accelerator pedal is not operated.

3. The method of claim 1, wherein the combustion knocking monitoring frequency band is the band of 10 kHz to 18 kHz, and
wherein the bearing damage monitoring frequency band is the band of 1 kHz to 8 kHz.

4. The method of claim 1, wherein the upon-acceleration diagnosis step comprises:
an upon-acceleration frequency monitoring step which monitors, by the controller, a vibration signal of the engine sensed by the knocking sensor in the combustion knocking monitoring frequency band;
an upon-acceleration diagnosis entry determination step which determines, by the controller, whether a time at which a sensor value of the knocking sensor exceeds a first reference value starting the diagnosis of the damage to the bearing is equal to or greater than a preset first reference time when the vehicle is accelerating;
an upon-acceleration damage determination step which determines, by the controller, whether a time at which the sensor value of the knocking sensor exceeds a second reference value determining the damage to the bearing is equal to or greater than a preset second reference time when the vehicle is accelerating and the sensor value of the knocking sensor exceeds the first reference value; and
an upon-acceleration diagnosis counter increment step which increases, by the controller, the upon-acceleration diagnosis counter for determining the damage to the bearing upon acceleration, when the sensor value of the knocking sensor exceeds the second reference value.

5. The method of claim 4, wherein the second reference value is set to be greater than the first reference value.

6. The method of claim 4, wherein the preset first reference time and the preset second reference time are set as a rotational cycle of the engine.

7. The method of claim 4, wherein in the upon-acceleration damage determination step, the sensor value of the knocking sensor is a moving average value.

8. The method of claim 4, wherein when the sensor value of the knocking sensor does not exceed the first reference value in the upon-acceleration diagnosis entry determination step, or the sensor value of the knocking sensor does not exceed the second reference value in the upon-acceleration damage determination step, one of the traveling state determination step and the upon-acceleration diagnosis entry determination step is performed again.

9. The method of claim 1, wherein the upon-deceleration diagnosis step comprises:
an upon-deceleration frequency monitoring step which monitors, by the controller, a vibration signal of the engine sensed by the knocking sensor in the bearing damage monitoring frequency band;
an upon-deceleration diagnosis entry determination step which determines, by the controller, whether a sensor value of the knocking sensor exceeds a third reference value starting the diagnosis for the damage to the bearing upon deceleration and a time at which the sensor value of the knocking sensor exceeds the third reference value is a third reference time or more starting the diagnosis for the damage to the bearing upon deceleration;
an upon-deceleration damage determination step which determines, by the controller, whether the sensor value of the knocking sensor exceeds a fourth reference value which is a reference value for determining the damage to the bearing; and
an upon-deceleration diagnosis counter increment step which increases, by the controller, an upon-deceleration diagnosis counter for determining the damage to the bearing upon deceleration when the sensor value of the knocking sensor exceeds the fourth reference value.

10. The method of claim 9, wherein the fourth reference value is set to be greater than the third reference value.

11. The method of claim 9, wherein the third reference time is set as a rotational cycle of the engine.

12. The method of claim 9, wherein when the sensor value of the knocking sensor does not exceed the third reference value in the upon-deceleration diagnosis entry determination step, or a time at which the sensor value of the knocking sensor exceeds the third reference value is less than the third reference time even if the sensor value of the knocking sensor exceeds the third reference value, one of the traveling state determination step and the upon-deceleration diagnosis entry determination step is performed again.

13. The method of claim 9, wherein when the sensor value of the knocking sensor does not exceed the fourth reference value in the upon-deceleration damage determination step, one of the traveling state determination step and the upon-deceleration diagnosis entry determination step is performed again.

14. The method of claim 1, wherein the bearing damage confirmation step confirms whether the upon-acceleration diagnosis count and the upon-deceleration diagnosis count are '1' or more, respectively.

15. The method of claim 1, further comprising:
before the traveling state determination step, performing a diagnosis start determination step which determines whether the engine or the vehicle is in a state for sensing the damage to the bearing,
wherein the diagnosis start determination step determines whether a temperature of an engine oil in the engine is greater than a preset diagnosis start temperature.

16. The method of claim 1, further comprising:
after the bearing damage confirmation step, performing a limp home mode step which limits revolutions per minute (RPM) of the engine to a preset maximum safety engine RPM or less.

17. The method of claim 1, further comprising:
after the bearing damage confirmation step, performing a warning means operation step which operates a warning means installed inside the vehicle, and alerts a passenger of the damage to the bearing when the bearing is damaged.

18. A method for sensing damage to a bearing of an engine for a vehicle, the method comprising:
a traveling state determination step which determines, by a controller, whether the vehicle is accelerating;
an upon-acceleration frequency monitoring step which monitors, by the controller, a vibration signal of the engine sensed by a knocking sensor in a combustion knocking monitoring frequency band, when the vehicle is accelerating;

an upon-acceleration diagnosis entry determination step which determines whether a time at which a sensor value of the knocking sensor exceeds a first reference value starting the diagnosis for the damage to the bearing is a preset first reference time or more upon acceleration;

an upon-acceleration damage determination step which determines whether a time at which the sensor value of the knocking sensor exceed a second reference value determining the damage to the bearing is a preset second reference time or more upon acceleration when the sensor value of the knocking sensor exceeds the first reference value;

an upon-acceleration diagnosis counter increment step which increases an upon-acceleration diagnosis counter for determining the damage to the bearing upon acceleration, when the sensor value of the knocking sensor exceeds the second reference value;

a damage determination step which compares, by the controller, the upon-acceleration diagnosis counter with a bearing damage reference for confirming the damage to the bearing; and a bearing damage confirmation step which confirms, by the controller, that the bearing is damaged, when the upon-acceleration diagnosis counter is the bearing damage reference or more.

19. The method of claim 18, further comprising:
after the bearing damage confirmation step, performing a limp home mode step which limits revolutions per minute (RPM) of the engine to a preset maximum safety engine RPM or less.

20. The method of claim 18, further comprising:
after the bearing damage confirmation step, performing a warning means operation step which operates a warning means installed inside the vehicle, and alerts a passenger of the damage to the bearing when the bearing is damaged.

21. A method for sensing damage to a bearing of an engine which senses the damage to the bearing installed on the engine with a vibration signal sensed by a knocking sensor installed on the engine for a vehicle, the method comprising:
a traveling state determination step which determines, by a controller for controlling the engine, whether the vehicle is decelerating;

an upon-deceleration frequency monitoring step which monitors, by the controller, the vibration signal of the engine sensed by the knocking sensor in a bearing damage monitoring frequency band, when it is determined that the vehicle is decelerating in the traveling state determination step;

an upon-deceleration diagnosis entry determination step which determines whether a sensor value of the knocking sensor exceeds a third reference value starting the diagnosis for the damage to the bearing and a time at which the sensor value of the knocking sensor exceeds the third reference value is a third reference time or more starting the diagnosis for the damage to the bearing upon deceleration;

an upon-deceleration damage determination step which determines whether the sensor value of the knocking sensor exceeds a fourth reference value which is a reference value for determining the damage to the bearing;

an upon-deceleration diagnosis counter increment step which increases an upon-deceleration diagnosis counter for determining the damage to the bearing upon deceleration when the sensor value of the knocking sensor exceeds the fourth reference value;

a damage determination step which compares, by the controller, the upon-deceleration diagnosis counter with a bearing damage reference for confirming the damage to the bearing; and a bearing damage confirmation step which confirms, by the controller, that the bearing is damaged, when the upon-deceleration diagnosis counter is the bearing damage reference or more.

22. The method of claim 21, further comprising:
after the bearing damage confirmation step, performing a limp home mode step which limits revolutions per minute (RPM) of the engine to a preset maximum safety engine RPM or less.

23. The method of claim 21, further comprising:
after the bearing damage confirmation step, performing a warning means operation step which operates a warning means installed inside the vehicle, and alerts a passenger of the damage to the bearing when the bearing is damaged.

* * * * *